United States Patent
Alapuranen

(10) Patent No.: US 7,433,322 B1
(45) Date of Patent: Oct. 7, 2008

(54) METHOD AND SYSTEM FOR MEASURING THE TIME-OF-FLIGHT OF A RADIO SIGNAL

(75) Inventor: Pertti O. Alapuranen, Deltona, FL (US)

(73) Assignee: MeshNetworks, Inc., Maitland, FL (US)

( * ) Notice: Subject to any disclaimer, the term of this patent is extended or adjusted under 35 U.S.C. 154(b) by 587 days.

(21) Appl. No.: 11/169,841

(22) Filed: Jun. 29, 2005

Related U.S. Application Data

(60) Provisional application No. 60/584,577, filed on Jun. 30, 2004.

(51) Int. Cl.
*H04Q 7/34* (2006.01)
(52) U.S. Cl. .................................................. 370/252
(58) Field of Classification Search ............... 370/252
See application file for complete search history.

(56) References Cited

U.S. PATENT DOCUMENTS

| | | | |
|---|---|---|---|
| 5,943,322 A | 8/1999 | Mayor | |
| 5,945,948 A * | 8/1999 | Buford et al. | 342/457 |
| 6,807,165 B2 | 10/2004 | Belcea | |
| 6,873,839 B2 | 3/2005 | Stanforth | |
| 2002/0058502 A1 | 5/2002 | Stanforth | |

\* cited by examiner

*Primary Examiner*—Melvin Marcelo
(74) *Attorney, Agent, or Firm*—Randi L. Karpinia; Joseph J. Buczynski

(57) ABSTRACT

A method and system for measuring the time-of-flight (TOF) of a radio signal is described herein. According to various implementations, the system uses multiple antennas, each of which receives direct path radio signals and reflected radio signals. In various implementations, the system sends a sequence of bursts that are detected using a cross correlation detector. The receiver steers antenna nulls to a different angles for each burst and measures the TOF at each angle. The system then calculates the minimum correlation peak from all measurements, and treats that correlation peak as the true, direct path TOF measurement.

16 Claims, 4 Drawing Sheets

| Sync pattern | Sync pattern | Sync pattern | Sync pattern | Sync pattern | Sync pattern |
|---|---|---|---|---|---|

METHOD AND SYSTEM FOR MEASURING THE TIME-OF-FLIGHT OF A RADIO SIGNAL

This application claims the benefit of U.S. Provisional Application No. 60/584,577, filed Jun. 30, 2004, the entire content being incorporated herein by reference.

BACKGROUND OF THE INVENTION

1. Field of the Invention

The present invention relates generally to a method and system for measuring the time-of-flight (TOF) of a radio signal and, more particularly, to a method and system that measures the TOF of a radio signal in a multi-path environment by reducing the amplitude of one or more of the received reflected paths by performing, for example, null steering on an antenna array of the receiving device, to increase the probability of measuring the direct path.

2. Description of the Related Art

Wireless communication networks, such as mobile wireless telephone networks, have become increasingly prevalent over the past decade. These wireless communications networks are commonly referred to as "cellular networks", because the network infrastructure is arranged to divide the service area into a plurality of regions called "cells". A terrestrial cellular network includes a plurality of interconnected base stations, or base nodes, that are distributed geographically at designated locations throughout the service area. Each base node includes one or more transceivers that are capable of transmitting and receiving electromagnetic signals, such as radio frequency (RF) communications signals, to and from mobile user nodes, such as wireless telephones, located within the coverage area. The communications signals include, for example, voice data that has been modulated according to a desired modulation technique and transmitted as data packets. As can be appreciated by one skilled in the art, network nodes transmit and receive data packet communications in a multiplexed format, such as time-division multiple access (TDMA) format, code-division multiple access (CDMA) format, or frequency-division multiple access (FDMA) format, which enables a single transceiver at a first node to communicate simultaneously with several other nodes in its coverage area.

In recent years, a type of mobile communications network known as an "ad-hoc" network has been developed. In this type of network, each mobile node is capable of operating as a base station or router for the other mobile nodes, thus eliminating the need for a fixed infrastructure of base stations. Details of an ad-hoc network are set forth in U.S. Pat. No. 5,943,322 to Mayor, the entire content of which is incorporated herein by reference.

More sophisticated ad-hoc networks are also being developed which, in addition to enabling mobile nodes to communicate with each other as in a conventional ad-hoc network, further enable the mobile nodes to access a fixed network and thus communicate with other mobile nodes, such as those on the public switched telephone network (PSTN), and on other networks such as the Internet. Details of these advanced types of ad-hoc networks are described in U.S. Pat. No. 7,072,650 entitled "Ad Hoc Peer-to-Peer Mobile Radio Access System Interfaced to the PSTN and Cellular Networks", granted on Jul. 4, 2006, in U.S. Pat. No. 6,807,165 entitled "Time Division Protocol for an Ad-Hoc, Peer-to-Peer Radio Network Having Coordinating Channel Access to Shared Parallel Data Channels with Separate Reservation Channel", granted on Oct. 19, 2004, and in U.S. Pat. No. 6,873,839 entitled "Prioritized-Routing for an Ad-Hoc, Peer-to-Peer, Mobile Radio Access System", granted on Mar. 29, 2005, the entire content of each being incorporated herein by reference.

In a wireless network, it is important to be able to measure the TOF of radio signals with accuracy. Knowing the TOF of radio signals between the various nodes of the network enables the distances between the nodes to be calculated and, ultimately, allows each of the nodes to be pinpointed in a 3-axis coordinate system. There are some environments in which measuring TOF can be challenging, however. Such environments include those in which the radio signals are often reflected and scattered, such as offices and factories. These environments are often called "multi path" environments, since radio waves can travel multiple paths to get from a source to a receiver—some of which are not direct, but are reflected. Obtaining accurate TOF measurements depends on measuring the TOF of signals that travel along a "direct path." However, direct path signals may be very weak and difficult to measure, due to scaling by the Automatic Gain Control of the receiver (limited dynamic range) and because of numerical limitations in base band processing.

BRIEF DESCRIPTION OF THE DRAWINGS

These and other objects, advantages and novel features of the invention will be more readily appreciated from the following detailed description when read in conjunction with the accompanying drawings, in which.

DETAILED DESCRIPTION OF THE PREFERRED EMBODIMENTS

Figure 1:
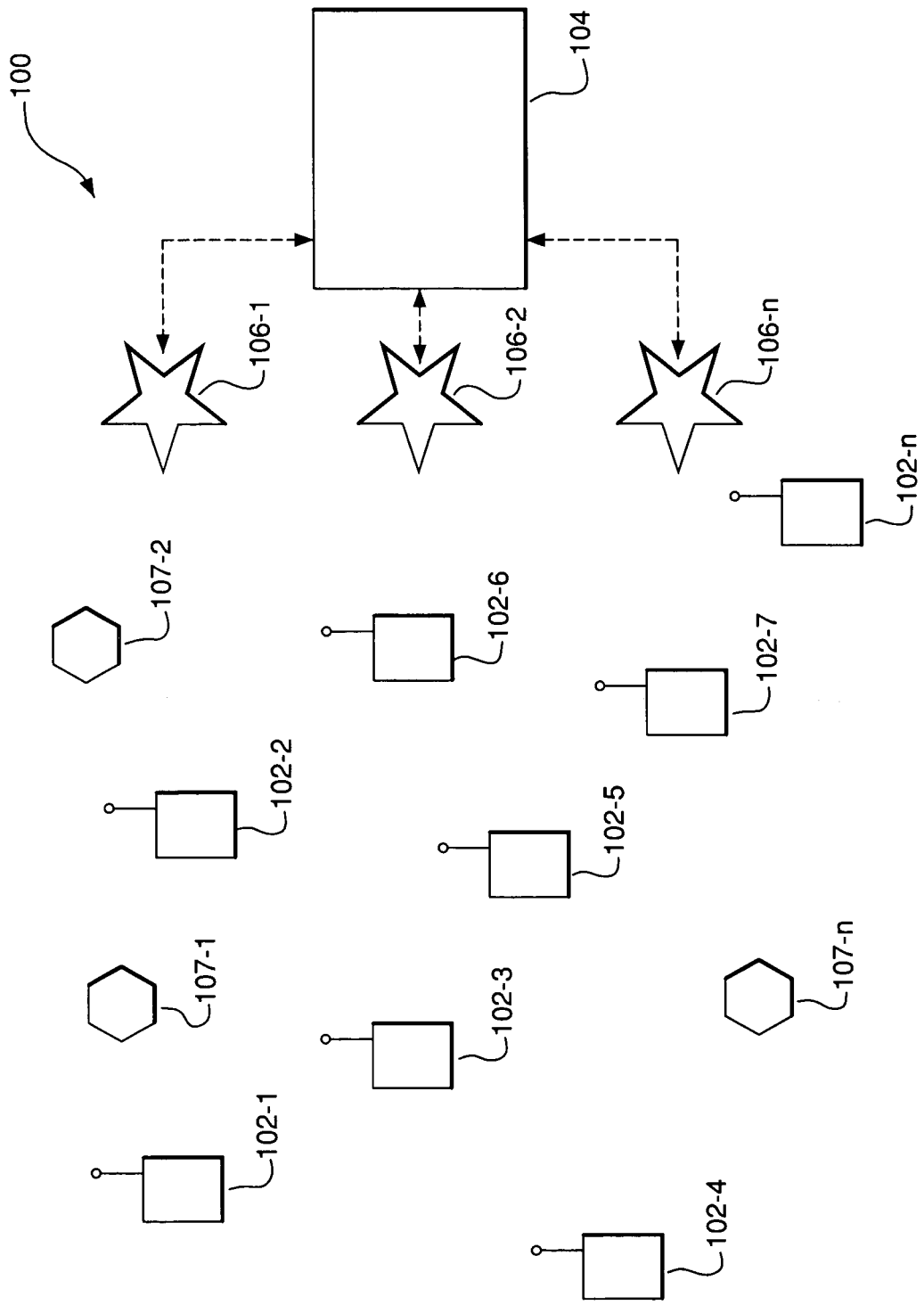
FIG. 1 is a block diagram of an example ad-hoc wireless communications network including a plurality of nodes employing a system and method in accordance with an embodiment of the present invention.

FIG. 1 is a block diagram illustrating an example of an ad-hoc packet-switched wireless communications network 100 employing an embodiment of the present invention. Specifically, the network 100 includes a plurality of mobile wireless user terminals 102-1 through 102-$n$ (referred to generally as nodes 102 or mobile nodes 102), and can, but is not required to, include a fixed network 104 having a plurality of access points 106-1, 106-2, . . . 106-$n$ (referred to generally as nodes 106 or access points 106), for providing nodes 102 with access to the fixed network 104. The fixed network 104 can include, for example, a core local access network (LAN), and a plurality of servers and gateway routers to provide network nodes with access to other networks, such as other ad-hoc networks, the public switched telephone network (PSTN) and the Internet. The network 100 further can include a plurality of fixed routers 107-1 through 107-$n$ (referred to generally as nodes 107 or fixed routers 107) for routing data packets between other nodes 102, 106 or 107. It is noted that for purposes of this discussion, the nodes discussed above can be collectively referred to as "nodes 102, 106 and 107", or simply "nodes".

As can be appreciated by one skilled in the art, the nodes 102, 106 and 107 are capable of communicating with each other directly, or via one or more other nodes 102, 106 or 107 operating as a router or routers for packets being sent between nodes, as described in U.S. Pat. No. 5,943,322 to Mayor, and in U.S. patent application Ser. Nos. 09/897,790, 09/815,157 and 09/815,164, referenced above.

Figure 2:
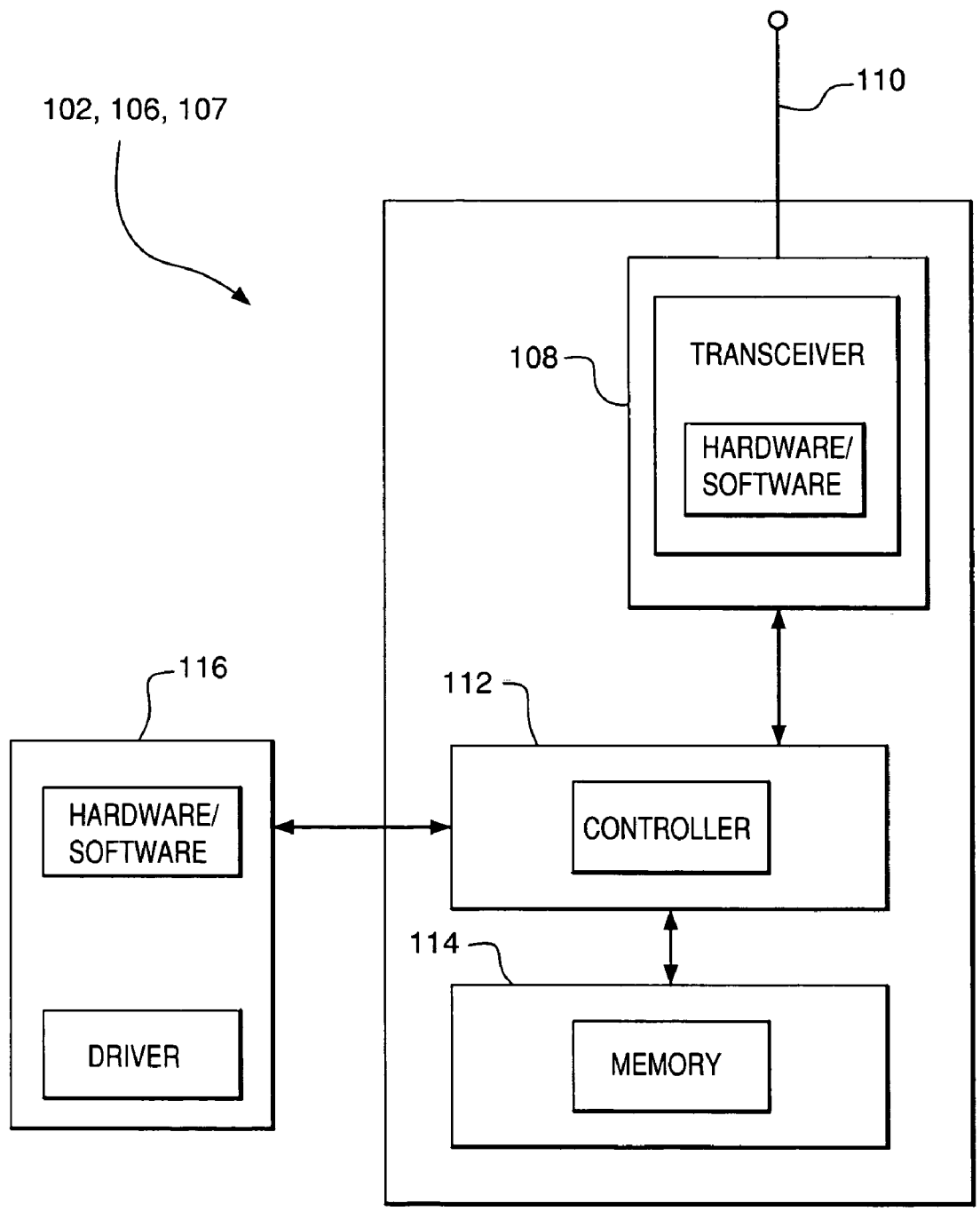
FIG. 2 is a block diagram illustrating an example of a mobile node employed in the network shown in FIG. 1.
Figures 3, 4:
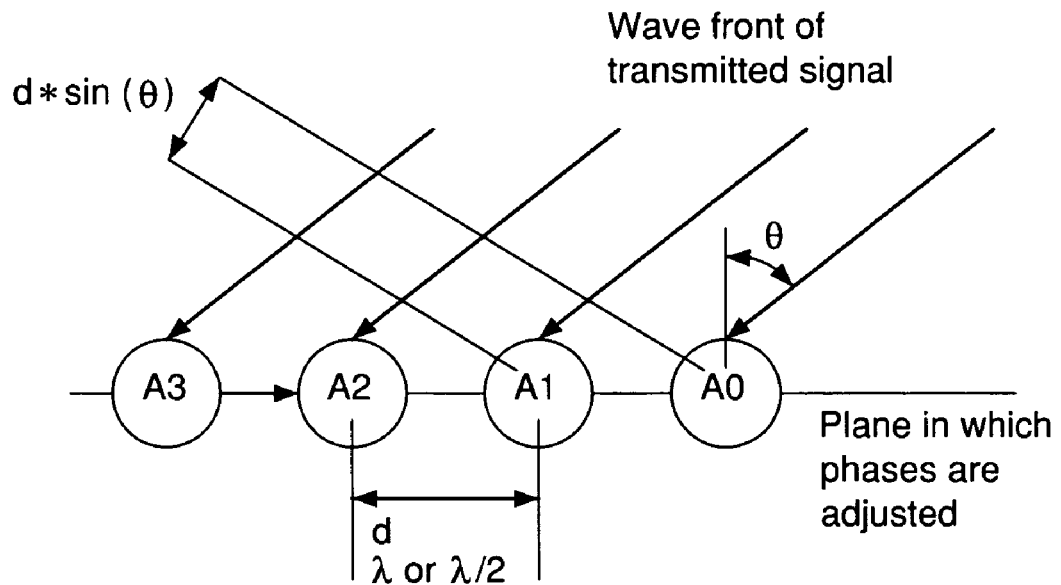
FIG. 3 illustrates an example of a system configured in accordance with an embodiment of the invention.
FIG. 4 illustrates a sync pattern transmitted according to an embodiment of the invention.

As shown in FIG. 2, each node 102, 106 and 107 includes a transceiver, or modem 108, which is coupled to an antenna 110 and is capable of receiving and transmitting signals, such as packetized signals, to and from the node 102, 106 or 107, under the control of a controller 112. The antenna 110 in this embodiment comprises the plurality of antennas A0, A1, A2 and A3 as shown in FIG. 3 and described below. However, the antenna 110 can include any number of two or more antennas. The packetized data signals can include, for example, voice, data or multimedia information, and packetized control signals, including node update information.

Each node 102, 106 and 107 further includes a memory 114, such as a random access memory (RAM) that is capable of storing, among other things, routing information pertaining to itself and other nodes in the network 100. As further shown in FIG. 2, certain nodes, especially mobile nodes 102, can include a host 116 which may consist of any number of devices, such as a notebook computer terminal, mobile telephone unit, mobile data unit, or any other suitable device. Each node 102, 106 and 107 also includes the appropriate hardware and software to perform Internet Protocol (IP) and Address Resolution Protocol (ARP), the purposes of which can be readily appreciated by one skilled in the art. The appropriate hardware and software to perform transmission control protocol (TCP) and user datagram protocol (UDP) may also be included.

The invention is generally directed to a method and system for measuring the time-of-flight (TOF) of a radio signal, in which spatial antenna processing is used to adaptively null some of the reflected paths. The earliest detected path, which has a higher probability of being the direct path, is then measured. Using multiple antennas, one or more nulls can be directed toward a path from which strong reflected signals are being received. This puts the direct path signals within the dynamic range of the receiver, thereby allowing the direct path to be measured.

It is known in the art that, by having a passive antenna array of N antennas, N−1 nulls can be generated. This principle has been used for interference cancellation in military communications or, for example, to block enemy signals from being received while allowing friendly signals to be received. A similar approach has also been used for improving signal to noise ratios in radio systems. However, unlike the existing systems and techniques, the invention does not use null steering to improve the signal-to-noise ratio, but rather to decrease it, and to reduce the power of reflected signals to make sure that the direct path signals are within the dynamic range of the receiver. Also, the criterion for antenna steering is the minimum TOF.

A method and system for measuring the time-of-flight (TOF) of a radio signal according to various embodiments of the invention will now be described in more detail. As will be appreciated from the following, the system uses multiple antennae, each of which receives direct path radio signals and reflected radio signals. The use of multiple antennae allows the creation of a single or multiple nulls and the control of the nulls in two or three angular dimensions. The system includes a beam former comprising a delay line/phase shifter circuit and combiner. The delay line/phase shifters receive signals from the antennas and create delays/phase shifts and the combiner adds these signals together. Additionally, the system includes a memory having stored therein preprogrammed parameters (weights) for the delay lines/phase shifters. The system accesses the memory by the burst number. This allows each burst to be received with a different antenna beam pattern and having nulls at different angles.

In an embodiment of the invention, the system has a preprogrammed set of delays/phase shifts (weights), and carries out the steps of receiving signals with a different set of delays/phase shifts for the antennas for each burst received, and then finding the smallest time of flight measurement from all the measurements. In the memory, the weights are indexed by burst number. Based on the burst number, the system feeds the appropriate set of weight factors to the beam-former to create one or more nulls at the desired angle for the received burst. The angle may be fixed for the burst number, since the optimal antenna beam-pattern may not be known before all of the burst TOF measurements are completed.

In various embodiments of the invention, the system sends a sequence of bursts that are detected using a cross correlation detector. The receiver steers the antennas to steer the null or nulls of antenna pattern to a different angle for each burst and measures the TOF at each angle. The system then calculates the earliest in time correlation peak from all measurements, and treats that correlation peak as the true direct path TOF measurement.

Referring to FIG. 3, a system configured according to an embodiment of the invention will now be described. Four antennas A0, A1, A2 and A3 of the antenna system are shown, although only two of the antennas—A0 and A1, for example—are necessary for carrying out the invention in a minimal configuration. Also, as can be appreciated by one skilled in the art, the antennas A0-A3 can be arranged in any suitable type of antenna pattern with respect to each other. The system operates by sending a sequence of sync bursts (shown in FIG. 4) that are received by A0-A3. The sync bursts can be sent from, for example, a node such as those described above. Each burst can include information, such as a time stamp, that indicates a time at which the sync burst was transmitted from the node. The antenna system comprising antennas A0-A3 is steered to a different angle for each burst in accordance with known beam steering techniques, for example. The controller 112 of the receiving node, for example, determines the minimum correlation peak arrival time from all received burst measurements. The minimum correlation peak arrival time is most likely representative of the correct TOF measurement as it is the most direct path, since it represented the minimum propagation time from the sending node. As can be appreciated by one skilled in the art, the TOF measurement can be determined by calculating the elapsed time from when a burst was transmitted by the sending node to the time at which receipt of the burst by antennas A0-A3 of the antenna system was detected, such as at the correlation peak arrival time for that burst.

Figure 5:
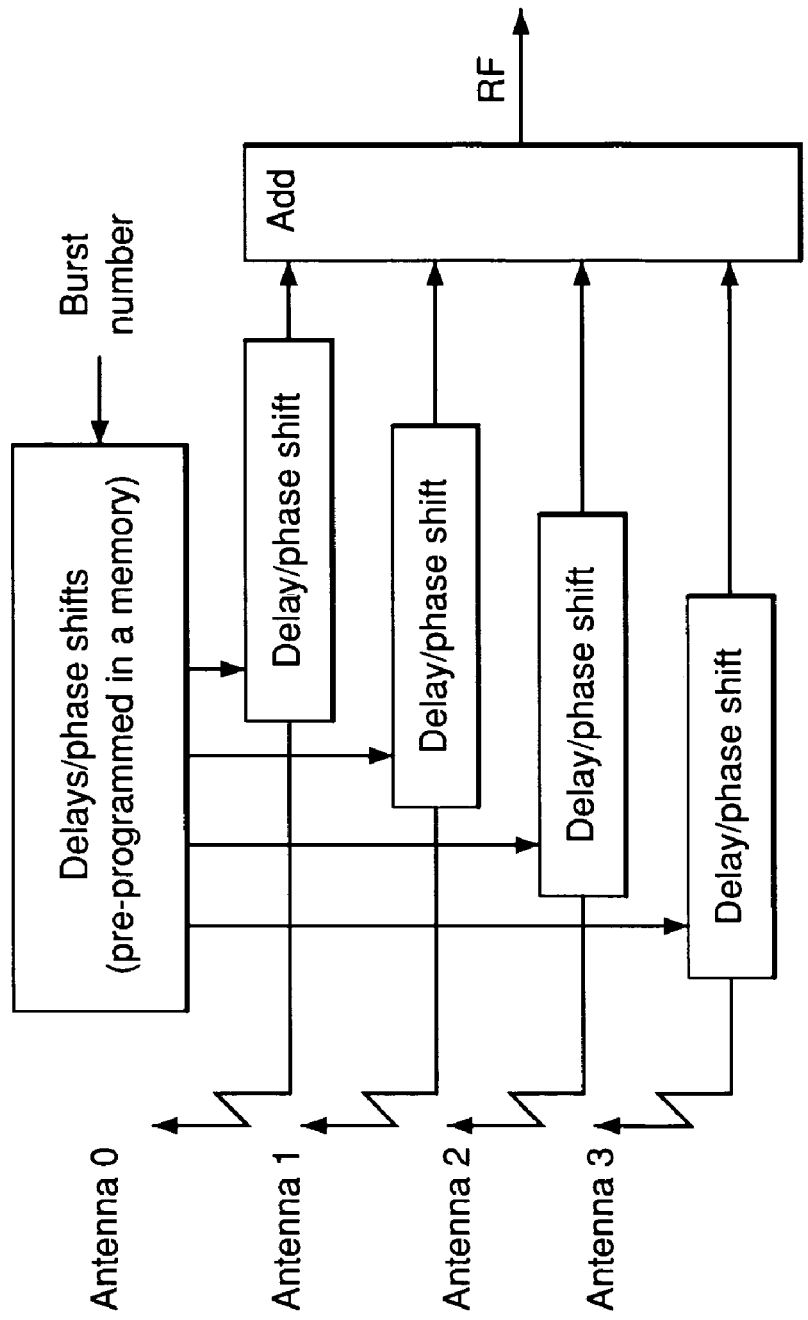
FIG. 5 illustrates a digital beam former in accordance with an embodiment of the invention.

The signals received by the antennas A0-A3 are then processed through a digital beam former as shown in FIG. 4. The delay/phase shifters and adder can be present in or performed by, for example, the transceiver 108 and controller 112 of a node, and use the pre-programmed delay/phase shifts that can be stored in memory 114. The digital beam former delays/phase shifts each antenna's respective received burst signal by the amount specified in the memory for that burst. The digital beam former then adds the delayed/phase shifted signals. Referring to FIG. 5, an embodiment of the beam former is shown. The signals from antennas A0 to A3 are transmitted to the delay/phase shift elements and a combiner, respectively. The signals are combined according to the following expression:

$$E = \sum_{K=0}^{N} A_k \exp\left\{j\left(\frac{2*\pi}{\lambda} D_k \sin\theta + \delta_k\right)\right\}$$

The wavelength of the radio signal is λ, the distance between antenna elements is $D_k$, the angle of the signal wave front is θ. Each signal is delayed (by the delay line) depending on the angle of arrival and the antenna position. $A_k$ and $\delta_k$ are adjustment items (weights) that are placed, respectively, on the amplitude and phase of a signal received at the k-th antenna element. These weights are adjusted so that the signals from the desired direction are nulled. The weights can be pre-computed and stored in a memory, and are indexed by burst position. Thus, the beam-former is programmed with weights to have nulls in locations according to the burst position. A synchronization signal is sent to the antennas N times, where N is the desired number of angles the null is steered and the number of times the TOF is measured. N also can correspond to the number of antennas, which in this example is four, but can be any suitable number as desired. Generally with N=4 antennas there are a maximum of 3 nulls and 4 sets of coefficients. The first set of coefficients for the antenna 0 (K=0) can be constants and not be adjustable since the beam forming uses relative phase difference between elements.

Referring again to FIG. 5, the adjustable delay line/phase shifter is changed for every synchronization burst and TOF is measured. As discussed above, the TOF is measured by sending bursts and receiving the bursts at the receiver node while performing beamforming on the received signal. With this beamforming, a sequence of bursts is sent and for each burst the receiver node turns the antenna pattern. The probability is high that at some point one null is reducing the amplitude of the received RF signal from the indirect path, and this causes the direct path to be above noise threshold as it is in the dynamic range. The reception time of the earliest burst is measured, and since each burst is of known length, the processing can determine which of the bursts in the sequence had smallest TOF. The receiving node can send a response to the transmitting node indicating this smallest TOF, and the transmitting node that transmitted the bursts can also forward such information. It is noted the null in antenna pattern is really a null at some angle. Compared to an omnidirectional antenna, this antenna has very weak gain at some angle corresponding to the null, and this angle can be changed. Having N−1 nulls means that there are N−1 angles at which antenna gain is very small. The process thus reduces the dynamic range of the received burst signal, which can be referred to as the input signal. The input signal may contain the information pertaining to the direct path signal, but due to strong multipath components, this direct path is squeezed by automatic gain control (AGC) and/or is small due to limitations in RF and baseband dynamic range. However, by using the beamforming technique as discussed above to steer a null to the strong multipath signal, the AGC adds more gain to the weak direct path signal to place that signal in the dynamic range of the receiver so that direct path signal can thus be detected.

As can be appreciated from the above, the angles at which the antenna system has very low gain, which are referred to as "nulls" in antenna radiation pattern, are changed. The 4 antennas thus operate together as a single antenna with a received radiation pattern that has the properties of interest for determining the TOF measurement. Accordingly, with 4 antenna elements, the antenna system can have 3 nulls at the same time in the radiation pattern. By changing the coefficients in the beamformer, these 3 nulls can be moved to an infinite amount of different combinations of 3 angles, and theoretically, the node can receive an infinite amount of bursts, one burst for each combination of 3 angles of the nulls. However, as a practical matter, the direct path signal can be identified after selecting a finite number of null angles according to the equation above. Ultimately, the null is rotated over a preprogrammed angle. In one embodiment, the null is rotated over 180 degrees. By measuring over a sufficient number of null directions, the system will be able to measure the direct path, since this path, if it is not in the dynamic range of the receiver, has a high probability of being in the range so that it can be detected at some angle when some reflected strong paths are attenuated as they are in the antenna nulls.

Although only a few exemplary embodiments of the present invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

What is claimed is:

1. A method for measuring the time-of-flight (TOF) of a signal transmitted as a plurality of bursts from a source in a wireless communication network, the method comprising:
   receiving the bursts at an antenna arrangement comprising a plurality of antennas at a node, and null steering the antenna arrangement to a respective null angle for each received burst to provide a plurality of respective received burst signals;
   performing a time delay or phase shift operation on each of the respective received burst signals, wherein the respective time delay or phase shift operation performed on each of the respective received burst signals is based on respective values stored in a memory associated with the antenna arrangement;
   determining a desired correlation peak arrival time based on the received burst signals; and
   determining the TOF of the signal based on the desired correlation peak arrival time.

2. A method as claimed in claim 1, wherein:
   the desired correlation peak arrival time is a minimum correlation peak arrival time.

3. A method as claimed in claim 1, wherein:
   the null steering algorithm adjusts at least one of the nulls in the antenna system radiation pattern for each respective burst.

4. A method as claimed in claim 1, wherein:
   the desired correlation peak arrival time determining step comprises combining the received burst signals that have been time delayed or phase shifted.

5. A method as claimed in claim 4, wherein:
   the null steering is performed by adjusting the received burst signals according to respective weight values associated with the respective antennas during the combining operation.

6. A method as claimed in claim 1, wherein:
   the antenna arrangement is disposed at a node operating in the wireless communication network.

7. A method as claimed in claim 6, wherein:
   the wireless communication network includes an ad-hoc wireless communication network in which the node is operating.

8. A method as claimed in claim 1, wherein:
   the antenna arrangement comprise four antennas.

9. A system for measuring the time-of-flight (TOF) of a signal transmitted as a plurality of bursts from a source in a wireless communication network, the system comprising:

an antenna arrangement comprising a plurality of antennas at a node, operating to receive the plurality of bursts; and a controller, operating to:

perform a null steering on the antenna arrangement to steer a null to a respective angle for each received burst to provide a plurality of respective received burst signals, perform a time delay or phase shift operation on each of the received burst signals prior to determining the desired correlation peak arrival time, wherein the respective time delay or phase shift operation performed on each of the respective received burst signals is based on respective values stored in a memory associated with the antenna arrangement, determine a desired correlation peak arrival time based on the received burst signals, and determine the TOF of the signal based on the desired correlation peak arrival time.

10. A system as claimed in claim 9, wherein:
the desired correlation peak arrival time is a minimum correlation peak arrival time.

11. A system as claimed in claim 9, wherein:
the null steering is performed to generate at least one null using one or more antenna elements of the antenna system for each respective received burst.

12. A system as claimed in claim 9, wherein:
the desired correlation peak arrival time determining operation comprises combining the received burst signals that have been time delayed or phase shifted.

13. A system as claimed in claim 12, wherein:
the null steering is performed by adjusting the received burst signals according to respective weight values associated with the respective antennas during the combining operation.

14. A system as claimed in claim 9, wherein:
the antenna arrangement and controller are disposed at a node operating in the wireless communication network.

15. A system as claimed in claim 14, wherein:
the wireless communication network includes an ad-hoc wireless communication network in which the node is operating.

16. A system as claimed in claim 9, wherein:
the antenna arrangement comprise four antennas.

* * * * *